Jan. 12, 1932.　　　L. D. O. MOITTIÉ　　　1,840,462

SHOCK ABSORBER

Filed Nov. 11, 1930

LUCIEN DOMINQUE OCTAVE MOITTIÉ
INVENTOR;

By Otto Munk
his Attorney

Patented Jan. 12, 1932

1,840,462

UNITED STATES PATENT OFFICE

LUCIEN DOMINIQUE OCTAVE MOITTIÉ, OF NEUILLY-SUR-SEINE, FRANCE, ASSIGNOR TO SOCIETE ANONYME DES ETABLISSEMENTS REPUSSEAU & CIE., OF LEVALLOIS-PERROT, FRANCE

SHOCK ABSORBER

Application filed November 11, 1930, Serial No. 494,834, and in France May 30, 1930.

The invention relates to helical antifriction bearings and to particular applications thereof.

Use has already been made of helical cam surfaces for the purpose of moving a piece along its longitudinal axis through rotation of a second piece aligned with the former. Such an arrangement, which is particularly used for taking up the plays has in certain applications a serious drawback because, owing to friction between the two helical cam surfaces, the arrangement is irreversible.

The present invention has for its object to provide a reversible arrangement of this kind and more particularly to provide a ball or roller helical bearing adapted to be inserted between the helical surfaces for reducing the friction and make the arrangement reversible.

The invention also contemplates the construction of a bearing of this kind in which the ball or roller cage is split radially and twisted in such manner that the points of contact of the balls or rollers with their race are located on an helix.

Such a thrust bearing, when interposed between the two aforesaid helical surfaces, converts the sliding friction into rolling friction, which is slight enough to insure complete reversibility of the system. Movement in one direction is produced by the controlling member, while movement in the other direction is caused by the reactions on the controlled member.

The invention also contemplates the various applications of this helical thrust bearing, in all devices requiring a reversible movement of small amplitude produced by a movement of large amplitude of the controlling member for securing the proper sensitiveness and taking up the play.

The invention is more particularly concerned with the application of this helical thrust bearing to shock-absorbers for motor vehicles, as hereinafter explained.

In the accompanying drawings, which is given solely by way of example:

Figure 1:
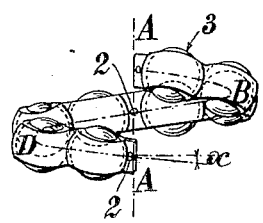
Fig. 1 shows a helical thrust ball bearing according to the invention.
Figure 2:
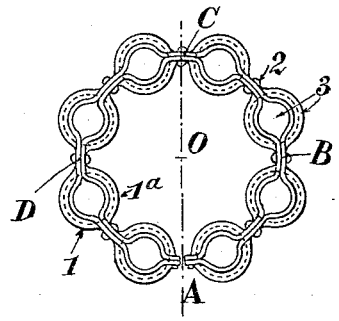
Fig. 2 is a plan view corresponding to Fig. 1.

According to the embodiment illustrated in Figs. 1 and 2, the cage is made as usual of two embossed webs 1 and 1$^a$ riveted together at 2 between the housings for the balls 3, which are held therein with a slight play. This annular cage is severed along a radial plane OA (Fig. 2) and twisted in such manner that the middle line ABCD which passes through the centres of balls 3 forms an helix having the desired inclination $x$.

Figure 3:
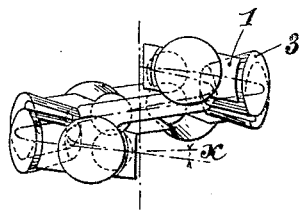
Fig. 3 shows a helical thrust roller bearing according to the invention.
Figure 4:
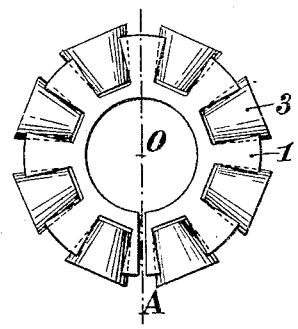
Fig. 4 is a corresponding plan view.

Figs. 3 and 4 illustrate a helical thrust roller bearing, whose rollers 3 are held in a cage 1 of the usual shape, severed radially along OA, and deformed as in the preceding example into an helix having the desired inclination $x$.

Figure 5:
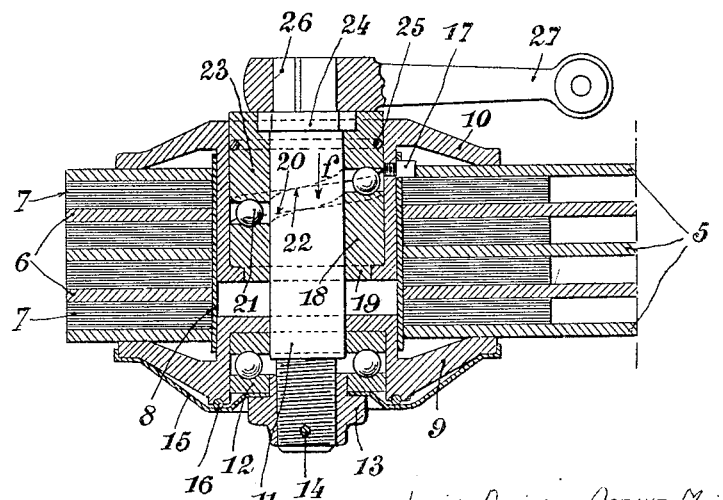
Fig. 5 is a longitudinal section of a shock-absorber for motor vehicle provided with a distant-adjusting arrangement and embodying a ball bearing according to the invention.

Fig. 5 shows by way of example, a particularly useful embodiment of this helical thrust bearing as applied to the distant-adjustment of shock-absorbers for motor or other vehicle, (either suspension shock-absorber, or anti-shimmy shock-absorber for steering wheels, or lateral stiffening absorbers, etc.

The shock-absorber comprises as usual a number of webs 5 rigidly connected together and a number of webs 6 also rigidly connected together. Friction washers 7, made of wood or other suitable material, are interposed between the adjacent webs 5 and 6. The ends of said webs (not shown) are hinged respectively on the two vehicle parts whose relative motions are to be absorbed; the connection may be any conventional one.

The webs and washers, which are strung over a socket 8, are clamped between two cups 9 and 10 whose outer peripheral contact parts may be made resilient.

Cup 9 is mounted loose with a slight clearance on a central pin 11 and is held by a thrust ball bearing 12, and a nut 13 screwed on the threaded end of pin 11 and locked thereon by a pin at 14. A cap 15 covering cup 9 is clamped between thrust ball bearing 12 and nut 13. Fluidtightness of the bearing is secured by means of a rubber ring 16 or any other suitable means.

Cup 10 is caused to rotate bodily with webs 5 by means of a stud 17 or any other suitable means and with a socket 18 housed within a tubular extension of said cup, by means of any desired connection such as a square fit, as shown at 19, or a flat face, flutes, pins, etc.

Socket 18 is centered and is rotatably and slidably mounted on pin 11 and its upper face 20 forms a helical race on which rests a helical thrust bearing 21 of the type shown in Fig. 1 or 3 (the cage being removed for the sake of clearness). The other helical race 22 is formed on a socket 23, rigidly connected with pin 11 by any suitable connection (hexagonal fit 24 for instance). Fluidtightness is secured, for instance, by means of a packing ring 25 arranged between socket 23 and cup 10.

A control lever 27 is keyed to the end of pin 11, for instance by means of a square fit 26.

The control lever 27 of the shock-absorber may be connected to any suitable distant controlling appliance (not shown) mounted on the dash-board of the vehicle, by any desired transmission means, such as a wire or cable, a single or double Bowden transmission, a rod and link gear, etc. The controlling appliance may either be a single one and adapted to control all the shock-absorbers of the vehicle, with or without the provision of balance levers, or it may be multiple, so as to control either the fore (or right hand) absorbers on the one hand, or the rear (or left-hand) absorbers on the other hand, (with or without balance-levers), or else the various individual absorbers, respectively.

The control of lever 27 is irreversible; for this purpose, the end of the sheath of the Bowden cable may be attached to webs 5 in such manner that rotation thereof about pin 11 will not rotate lever 27 with respect to such webs, this occurring in normal operation, as will be hereinafter explained.

In normal operation, due to the relative movements of the vehicle parts, webs 5 are rotated with respect to webs 6, thus rotating cup 10 and socket 18, which, in its turn, rotates socket 23 through the medium of thrust bearing 21, and hence pin 11 and lever 27; rotation of the latter is permitted due to the attachment of the Bowden sheath on webs 5. Consequently, there is no relative movement of members 18 and 23, and hence rotation thereof does not alter the pressure exercised by cups 9 and 10 upon the washers and webs 5—6—7.

If it is now desired to increase the clamping pressure or to take up the wear, lever 27 is pivoted relatively to webs 5, either by hand or by means of a distant adjusting gear. Lever 27 rotates pin 11 and socket 23 with respect to socket 18, secured to webs 5. The thrust bearing will thus force socket 18 axially in the direction of arrow $f$. Socket 18 will thus urge cup 10 downwardly and press it against the washers and webs 5—6—7 with an increased pressure. At the same time, socket 23 tends to move in the reverse direction, thus pressing cup 9 against the opposite outer web 5. Thus, adjustment of lever 27 will cause tightening of the absorber and taking up the play.

The adjusted pressure may be preserved by means of any suitable locking device for holding fast the irreversible control means for lever 27. When such locking device no longer acts upon the irreversible control means for lever 27 and when such control means is released, the helical thrust bearing 21, which operates in a reversible manner, urges back the several parts to their initial position, through the reaction of the parts.

Of course, the invention is in no way limited to the constructional forms or to the particular embodiment herein described, which are given solely by way of example.

Having now described my invention, what I claim as new and desire to secure by Letters Patent is:

1. In a friction shock-absorber, a number of friction members having relative displacements, and a common pivot pin for said members and clamping members movable in the direction of the axis of said pin and adapted to press on the opposite faces of the friction members, a helical antifriction bearing for connecting said clamping members, comprising a helical cage enclosing a number of spaced rolling members and formed from a radially split annular cage, and means for rotating one clamping member with respect to the other.

2. In a friction shock-absorber, a number of friction members having relative displacements, and a common pivot pin for said members and clamping members movable in the direction of the axis of said pin and adapted to press on the opposite faces of the friction members, a helical antifriction bearing for connecting said clamping members, comprising a helical cage enclosing a number of spaced rolling members and formed from a radially split annular cage, and irreversible means for rotating one clamping member with respect to the other.

3. In a friction shock-absorber, a first set of rigidly connected webs, a second set of webs adapted to rotate bodily with respect to the first, friction washers interposed between adjacent webs, a cylindrical bore in said webs and washers unit, a pivot pin of smaller diameter extending through said bore, a clamping member adapted to press on said unit, a thrust bearing between one end of said pin and said clamping member, a clamping member adapted to press on the opposite face of said unit and having a hollow cylindrical extension extending through said bore, a socket rotatable with and arranged within said extension and having a helical race, a socket rotatable with said pin and arranged within said extension and having a helical race facing said first-mentioned helical race, a number of rolling members, a helical cage for holding said rolling members at the desired spacing, and a control lever keyed to said pin at the end opposite said thrust bearing, said pin extending through said sockets.

4. In a friction shock-absorber as claimed in claim 3, means for securing together said second-mentioned clamping member and one set of webs, and a distant control member embodying a wire attached to said lever, a sheath enclosing said wire and means for attaching one end of said sheath to said last-mentioned set of webs.

In testimony whereof I have signed my name to this specification.

LUCIEN DOMINIQUE OCTAVE MOITTIÉ.